Patented Mar. 11, 1952

2,588,776

UNITED STATES PATENT OFFICE 2,588,776

APPARATUS FOR TESTING STORAGE BATTERIES

George S. Tanner, St. Croix Beach, Minn., assignor to Gould-National Batteries, Inc., St. Paul, Minn., a corporation of Delaware Application May 26, 1950, Serial No. 164,344

14 Claims. (Cl. 175—183)

This invention relates to storage battery testers and has for its principal object to provide testing apparatus which is rendered unusually accurate and easily understandable by reason of a novel relationship between the ohmage values of variable and fixed resistances included in a load circuit and a condition indicator calibrated in relation to the variable resistance whereby readings indicative of the condition of the several batteries are spread over the entire scale of the condition indicator.

A particular object is to provide testing apparatus having a condition indicator which is operative when the battery is discharging at a predetermined high rate and wherein the final indication of the state of charge is proportional to the voltage drop across a variable resistance which, together with a fixed resistance, is included in a load circuit connected across the terminals of the battery and wherein the ohmage values of the variable and fixed resistances are so related one to the other as to cause readings indicative of the condition of the batteries to be spread over the entire scale of the condition indicator whereby ususually accurate and easily understandable readings are obtained and no special apparatus is required to compensate for variations in the capacities of the batteries to be tested, or for depressing the zero of the indicator.

A further object is to provide battery testing apparatus of the character described wherein the variable resistance and fixed resistance may be arranged either in parallel branches of the load circuit or in series one with the other in the load circuit.

Another object is to provide a battery tester having variable and fixed resistances included in the load circuit and related one to the other, as described, in combination with a condition indicator calibrated in relation to the variable resistance and having a scale and a movable member movable proportionally to the adjustment of the variable resistance which by reference to said scale is capable of giving a final reading which is proportional to the voltage drop across the variable resistance exclusive of the drop across the terminals of the fixed resistance.

Another object is to provide a tester and condition indicator of the character described which is calibrated and readily adjustable for temperature compensation.

Other objects will appear and be more fully pointed out in the following specification and claims.

In the accompanying drawings, I have shown diagrammatically suitable apparatus and circuits for carrying out my invention, but it will be understood that the invention is not limited to the particular construction shown.

Referring to the drawings:

Figure 1 is a wiring diagram showing suitable apparatus connected to a storage battery to be tested and arranged according to the present invention;

Fig. 2 is a diagrammatic illustration of an alternate or modified form of the invention;

Fig. 3 illustrates a suitable ammeter dial and the legends thereon for the circuit arrangement shown in Fig. 2;

Fig. 4 is a wiring diagram showing another form of suitable apparatus and circuits wherein the variable resistance and fixed resistance are in series in the load circuit, and Fig. 5 is a similar diagram illustrating a modification of the circuits and apparatus shown in Fig. 4.

Referring to Fig. 1, a battery to be tested is indicated by the numeral 5 and is shown with its terminals connected to leads 6 and 7 respectively of load and tester circuits. These leads may be provided with the usual or suitable clamps for making the terminal connections with the battery posts. A main load circuit includes a shunt 8 for an ammeter 9, contacts 10 and 11 of a relay operated switch, a fixed low resistance 12 and suitable wiring connected to the lead 6. The contacts 10 and 11 are spring biased to open position and are adapted to be closed under control of a relay having a coil 13 which is included in a circuit 14 connected across the battery terminals and under control of a manually operable switch 15.

Connected as a shunt across the fixed resistance 12 is a branch load circuit including a wire 16, a variable resistance 17 and a wire 18. A movable contact 17a is carried by a handle 19 which may be turned to cut out any desired portion of the resistance 17 from the branch load circuit. The ohmage value of the resistance 17 is preferably correlated to that of the fixed resistance 12 so that the ohmage value of resistance 17 may be varied from approximately 5 to 50 times that of the resistance 12. For example, where a maximum current equal to approximately 300 amperes is to be drawn from the various batteries during the tests, a resistance 12 equal to .018 ohm may be provided and the resistance 17 may be designed to have an ohmage value ranging from .1 to .6 ohm. In this case it may be adjusted to cause the branch load circuit to carry from about 7 to 60 amperes of the total load of about 300 amperes, depending on the adjusted position of the rheostat contact 17a, and with variations of impressed voltage between 6 and 4.2 volts.

The handle 19 is provided with a pointer 20 which, by reference to an arcuate scale 21, indicates the condition of the battery under test. This scale is calibrated to give final readings which are proportional to the current flowing in the branch load circuit and may be provided, as shown, with legends ranging from "Full," indicating a fully charged battery in good condition, to "Danger," indicating that the battery is in a discharged or poor condition, and with intermediate graduations marked "¾," "½" and "¼" indicating corresponding fractions of full charge.

To facilitate the closing of the circuit including the relay coil 13, the switch 15 may be connected mechanically to the handle 19. As shown, the mechanical connection comprises a cam 22 mounted to turn with the handle 19 and a roller 23 operatively connected to the switch 15 and held in contact with the periphery of the cam by a spring 23a. The cam 22 is arranged to close the switch 15 as the contact member 17a closes the circuit through the resistance 17 and also to hold the circuit 14 closed under control of the handle 19.

The ammeter 9 has an indicator hand 25 and is calibrated to give readings which are proportional to the total current drawn from the several batteries during the tests. An important feature of this ammeter is a temperature scale 24 which is calibrated for variations in the operating temperatures of the batteries when they are delivering current at a rate which is equal to the normal output of a fully charged battery discharging through the load circuits. For example, the 80° F. temperature mark on the scale 24 may coincide with the 250 ampere mark because a fully charged, three cell battery of medium capacity is capable of delivering 250 amperes at 80° through the resistances 12 (.013 ohm) and 17 (.6 ohm) when in fully charged condition. This same fully charged battery when discharging through the same resistances at 0° F. would deliver only 210 amperes. Accordingly, the zero temperature mark coincides with the 210 ampere mark on the scale 24 and other temperature marks are located by calibration in a similar manner. It will thus be evident that the ammeter 9 constitutes a temperature selector which compensates for variations in the current output of the several batteries when they are presented for test at various temperatures.

To test a battery, assuming that the load circuit is open at the contacts 10 and 11, the leads 6 and 7 are connected to the respective terminals of the battery and then the handle 19 is operated to close the switch 15 and thereby cause the load circuit to be closed at the contacts 10 and 11 by operation of the relay. Now the knob 19 is turned to adjust the total current flowing in the load circuit to a predetermined standard value, irrespective of the state of charge of the battery. Specifically, this is accomplished by movement of the variable resistance control handle 19 to such position that the hand 25 of the ammeter 9 points to the temperature of the battery. When this has been done, the pointer 20, by reference to the scale 21, will indicate the state of charge of the battery. Any indication below full charge will require recharging and further test to determine whether the battery is in a usable condition or should be replaced. Should a battery fail to deliver the necessary current after the contact 17a has been adjusted to include the minimum resistance 17 in the shunt load circuit, such battery is either worn out, fully discharged, badly sulphated or has a defective cell. It should be recharged for a suitable period of time and subjected to a further test.

In the arrangement of apparatus shown in Fig. 2, the main and branch load circuits, controls and variable resistance 17 are substantially identical with those hereinbefore described but instead of providing the indicator scale 21 associated directly with the variable resistance, I provide an indicator scale 26 (Figs. 2 and 3) associated with an ammeter 27. This is a dual purpose ammeter providing readings on a temperature scale 24a which are proportional to the current flowing in the entire load circuit and readings on the scale 26 which are proportional to the current flowing in the branch load circuit, including the variable resistance 17. In this case circuit wires are extended from the shunt 8 to fixed contacts 28 and 29 of a switch having a manually operable member 30 and spring contacts 31 and 32 connected to the respective terminals of the ammeter 27. Switch contacts 33 and 34 are connected respectively by wires 35 and 36 to a shunt 37 in the branch load circuit including the resistance 17. The contact members 31 and 32 are preferably spring biased to connect the ammeter 27 to the shunt 8.

To test a battery by operation of the apparatus shown in Fig. 2, the terminal connections with the battery are made as hereinbefore described and the resistance control handle 19 is turned to close the load circuits and cut out enough of the resistance 17 to bring the ammeter hand 25 to a position on the scale 24a corresponding approximately to the actual temperature of the battery. The switch member 30 is thereupon actuated to shift the members 31 and 32 from the contacts 28 and 29 to the contacts 33 and 34 thereby closing the circuit from the shunt 37 including the wires 35 and 36 and making the ammeter 27 operative to give a reading which is proportional to the current flowing in the branch load circuit. The ammeter hand 25, by reference to the scale 26, now indicates the condition of the battery.

As indicated in Fig. 3, the entire range of the scale 26 is utilized as a condition indicator having wide zones designating respectively the fully charged and several fractional charge conditions of the battery on test. These several zone subdivisions, like those of the scale 21 (Fig. 1) are wide enough to cover variations in the readings caused by variations in the sizes of automotive batteries which presently range from 13 to 23 plates per cell. Ampere markings may also be provided in association with the condition indicator scale ranging from zero to 50 amperes, as shown. The temperature scale 24a is calibrated for the larger range required for the measurement of total loads up to 300 amperes. It will be evident that the calibration of the ammeter 27, as described, merely requires appropriate design of the shunts 8 and 37 in relation to the maximum current to be carried by the main and shunt load circuits. By thus employing a single ammeter with scales adapted respectively to give final readings which are proportional to the total load current and that flowing in the branch load circuit I reduce the cost of the apparatus as compared with a tester having separate ammeters for the respective measurements. Where two ammeters are provided, one in the main load circuit and the other in the shunt load circuit, the switch having the member 30 may be eliminated.

Unusually accurate and easily understandable readings are obtained by making the final readings proportional to the current flowing in the branch load circuit including the variable resistance 17. This circuit is adapted to carry that portion of the total load which is equal to the difference between the normal output of a fully charged battery and the output of one which has only three-fourths of its full charge. For three cell automotive batteries discharging at room temperature through resistance 12 at .018 ohm and resistance 17, at .6 to .1 ohm, voltage readings ranging from 5.2 volts at full charge to 4.2 when discharged are obtained. The indicator scales 21 and 26 cover the corresponding current values or fractional parts of total load which is placed on the batteries undergoing test. Variations in the current output of the batteries of different sizes do not materially affect the accuracy of the present test because of the wide range of readings obtainable in any subdivision or zone of the indicator scales 21 or 26.

To utilize my invention in the form described with reference to Figs. 1–3 to best advantage, it is important that the branch load circuit have a variable resistance of such maximum value as to carry current equal to from one-tenth to one-third of that flowing in the main load circuit, including the fixed resistance 12, and it is preferable to correlate the fixed resistances 12 to the variable resistance 17 so that the former will carry from 4 to 50 times more current than the branch load circuit, depending on the adjustment of the variable resistance.

Referring to Fig. 4, a battery to be tested is indicated by the numeral 5 and is shown with its terminals connected to leads 38 and 39 respectively of load and tester circuits. These leads may be provided with the usual or suitable clamps for making the terminal connections with the battery posts. A load circuit includes a shunt 40 for an ammeter 41, contacts 42 and 43 of a relay operated switch, a variable resistance 44 and a fixed resistance 45. The contacts 42 and 43 are spring biased to open position and are adapted to be closed under control of a relay having a coil 46 which is included in a circuit 47 connected across the battery terminals and under control of a manually operable switch 48.

The variable resistance 44 has a movable contact member 49 carried by a handle 50 which may be turned to cut out any desired portion of the resistance 44 from the load circuit. The maximum ohmage value of the resistance 44 is preferably equal to from ½ to ⅕ of that of the fixed resistance 45. For example, where a maximum current equal to approximately 100 amperes is to be drawn from the various batteries during the tests, a resistance 45 equal to .045 ohm and a variable resistance 44 equal to .015 ohm may be provided. In this case resistance 44 may be adjusted to cut out not to exceed approximately one-fourth of the total resistance in the load circuit. Consequently the voltage drop across the variable resistance may be varied from zero to approximately one volt in testing ordinary three cell automotive storage batteries which deliver current under load at approximately 5.2 volts when fully charged and at about 4.2 volts at approximately three-fourths full charge.

The handle 50 is provided with a pointer 51 which, by reference to an arcuate scale 52, indicates the condition of the battery under test. This scale is calibrated to give final readings which are proportional to the voltage drop across the resistance 44. As shown, it has legends ranging from "Full," indicating a fully charged battery in good condition to "Danger," indicating that the battery is in a discharged or poor condition, and with intermediate graduations marked "¾," "½" and "¼" indicating corresponding fractions of full charge.

To facilitate the closing of the circuit including the relay coil 46, the switch 48 may be connected mechanically to the handle 50. As shown, the mechanical connection comprises a cam 53 mounted to turn with the handle 50 and a roller 54 operatively connected to the switch 48 and held in contact with the periphery of the cam by a spring 55. The cam 53 is arranged to close the switch 48 as the contact member 49 closes the circuit through the resistance 44 and also to hold the circuit 47 closed under control of the handle 50.

The ammeter 41 has an indicator hand 56 and is calibrated to give readings which are proportional to the total current drawn from the several batteries during the tests. An important feature of this ammeter is a temperature scale 57 which is calibrated for variations in the operating temperatures of the batteries when they are delivering current at a rate which is equal to the normal output of a fully charged battery discharging through the load circuit. For example, the 80° F. temperature mark on the scale 57 may coincide with the 86 ampere mark because a fully charged, three cell battery of medium capacity is capable of delivering 86 amperes at 80° through the resistances 44 and 45 (.06 ohm) when in fully charged condition. This same fully charged battery when discharging through these resistances at 0° F. would deliver only 73 amperes. Accordingly, the zero temperature mark coincides with the 73 ampere mark on the scale 57 and other temperature marks are located by calibration in a similar manner. It will thus be evident that the ammeter 41 constitutes a temperature selector which compensates for variations in the current output of the several batteries when they are presented for test at various temperatures.

To test a battery, assuming that the load circuit is open at the contacts 42 and 43, the leads 38 and 39 are connected to the respective terminals of the battery and then the handle 50 is operated to close the switch 48 and thereby cause the load circuit to be closed at the contacts 42 and 43 by operation of the relay. Now the handle 50 is turned to adjust the total current flowing in the load circuits to a predetermined standard value, irrespective of the state of charge of the battery. Specifically, this is accomplished by movement of the variable resistance control handle 50 to such position that the hand 56 of the ammeter 41 points to the temperature mark on the scale 57 corresponding to the actual temperature of the battery. When this has been done, the pointer 51 by reference to the scale 52, will indicate the state of charge of the battery. In most cases where the tests give indications below full charge the batteries will require recharging and further test to determine whether they are in usable condition or should be replaced. Should a battery fail to deliver the necessary current after the contact member 49 has been adjusted to cut out the entire resistance 44 from the load circuit, such battery is either worn out, fully discharged, badly sulphated or has a defective cell. It should be recharged for a suitable period of time and subjected to a further test.

In the arrangement of apparatus shown in Fig. 5, the load circuit, controls, fixed resistance 45, ammeter 41 and resistance 44 are substantially identical with those hereinbefore described but instead of providing the indicator hand 51 and scale 52 associated mechanically with the variable resistance 44, I provide a voltmeter 58 associated electrically with said resistance, being connected across the terminals of the variable resistance 44. This voltmeter has a condition indicator scale 59 and a hand 60 which, by reference to the scale 59, gives final readings which are proportional to the voltage drop across the variable resistance 44. For maximum accuracy a total range of readings equal to approximately one volt is spread over the entire scale 59.

To test a battery by operation of the apparatus shown in Fig. 5, the terminal connections with the battery are made as hereinbefore described and the resistance control handle 50 is turned to close the load circuit and cut out enough of the resistance 44 to bring the ammeter hand 56 to a position on the scale 57 corresponding approximately to the actual temperature of the battery. The voltmeter hand 60 now indicates the condition of the battery on the scale 59. The entire range of the scale 59 is utilized as a condition indicator having wide zones designating respectively the fully charged and several fractional charge conditions of the battery on test. These several zone subdivisions, like those of the scale 52 (Fig. 4) are wide enough to cover variations in the readings caused by variations in the sizes of automotive batteries which presently range from 13 to 23 plates per cell. Voltage markings may also be provided, as shown, in association with the condition indicator scale ranging from zero to 1.2 volts. Other types of variable resistances, such as carbon pile, for example, may be substituted for the rheostat shown.

Unusually accurate and easily understandable readings are obtained by making the final readings proportional to the voltage drop across the variable resistance rather than across the battery terminals. With this arrangement, variations in the current output of the batteries of different sizes do not materially affect the accuracy of the test because of the wide range of readings obtainable in any subdivision or sector of the indicator scales 52 or 59. To utilize my invention in the form described with reference to Figs. 4 and 5 to best advantage, it is important that the ohmage value of the variable resistance 34 shall not exceed one-half that of the fixed resistance 35 in series therewith.

It will be evident that according to each of the forms of my invention herein described I obtain full scale deflection of the indicator hand by spreading the critical range of values, represented by readings showing battery or cell capacities from about 70% to 100% of normal capacity, over the entire scale of the condition indicator in each case. This is accomplished by unusually simple, reliable and inexpensive means comprising a load circuit including fixed and variable resistances having predetermined interrelated ohmage values and a condition indicator calibrated in relation to the variable resistance and capable of giving a final reading which is proportional to the voltage drop across the variable resistance exclusive of that across the fixed resistance of the load circuit.

The present application is in part a continuation of my application Serial No. 584,387, filed March 23, 1945, and in part a continuation of my application Serial No. 584,953, filed March 26, 1945, both of which applications have been abandoned.

Having described my invention, what I claim as new and desire to protect by Letters Patent is:

1. A storage battery tester comprising, a load circuit adapted to be connected to the terminals of the battery cell or cells to be tested, a fixed resistance and a variable resistance included in said load circuit, said variable resistance being adjustable to draw a predetermined current from the cell or cells under test and a condition indicator calibrated in relation to said variable resistance and having a scale and a movable member movable proportionally to the adjustment of said variable resistance which by reference to said scale is capable of giving a final reading which is proportional to the voltage drop across said variable resistance exclusive of the drop across the terminals of said fixed resistance when current of a predetermined fixed value is flowing in said load circuit, the ohmage values of said fixed and variable resistances being so related one to the other as to cause readings indicative of the capacity of the cell or cells above 70% of normal capacity to be spread over the entire scale of said condition indicator.

2. A storage battery tester comprising, a load circuit adapted to be connected to the battery to be tested, a fixed resistance and a variable resistance included in said load circuit, an ammeter connected in series in said load circuit, a temperature indicator scale associated with said ammeter whereby the latter becomes a temperature selector and compensator and a condition indicator calibrated in relation to said variable resistance and having a scale and a movable member movable in proportion to the adjustment of said variable resistance which by reference to said scale is capable of giving a final reading which is proportional to the voltage drop across the terminals of said variable resistance when current of a predetermined fixed value is flowing in said load circuit, the ohmage values of said fixed and variable resistances being so related one to the other as to cause readings indicative of the capacity of the battery above 70% of its normal capacity to be spread over the entire indicator scale.

3. A storage battery tester comprising, a load circuit having a fixed low resistance adapted to be connected across the terminals of a battery, a second load circuit including a variable resistance adapted to be connected across the terminals of a battery, the ohmage value of said variable resistance being from 5 to 50 times greater than that of the first mentioned load circuit and a condition indicator which is modified in its indications by the position of said variable resistance and capable of giving a final reading which is proportional to the current flowing in said second circuit exclusive of that flowing in said first mentioned circuit when current of predetermined fixed value is flowing in said load circuits.

4. A storage battery tester comprising, a load circuit having a fixed low resistance adapted to be connected across the terminals of a battery, a second load circuit including a variable resistance adapted to be connected across the terminals of a battery, said variable resistance having such maximum ohmage value as to carry $\tfrac{1}{5}$ to $\tfrac{1}{3}$ of the current flowing in said first mentioned load circuit when both of said load circuits are connected across the battery, a meter adapted to be included in both of said load circuits to indicate when a predetermined total current is flowing in said circuits and a condition indicator modified in its indication by the position of said variable resistance and capable of giving a final reading which is proportional to the current flowing in said second circuit exclusive of that flowing in said first mentioned circuit when both of said load circuits are connected across the battery and said variable resistance is adjusted to draw current of a predetermined fixed value from the battery.

5. A storage battery tester comprising, a load circuit having a fixed low resistance adapted to be connected across the terminals of a battery, a second load circuit including a variable resistance adapted to be connected across the terminals of a battery, said variable resistance having such maximum ohmage value as to carry $\frac{1}{10}$ to $\frac{1}{3}$ of the current flowing in said first mentioned load circuit when both of said load circuits are connected across the battery, a meter adapted to be included in both of said load circuits to give readings which are proportional to the total current flowing in said load circuits and a condition indicator which is modified in its indication by the position of said variable resistance, having a scale which is calibrated in relation to said variable resistance and having a manually adjustable hand operatively connected to said variable resistance and adapted to give a final reading by reference to said scale which is proportional to the current flowing in said second circuit exclusive of that flowing in said first mentioned circuit when current of a predetermined value is flowing in said load circuits.

6. A storage battery tester comprising, a load circuit having a fixed low resistance adapted to be connected across the terminals of a battery, a second load circuit including a variable resistance adapted to be connected across the terminals of a battery, said variable resistance having such maximum ohmage value as to carry $\frac{1}{10}$ to $\frac{1}{3}$ of the current flowing in said first mentioned load circuit when both of said load circuits are connected across the battery, a meter included in both of said load circuits to give readings which are proportional to the total current flowing in said load circuits and a condition indicator modified in its indication by the position of said variable resistance, having a scale which is calibrated in relation to said variable resistance and having a manually adjustable hand operated to vary said variable resistance and capable of giving a final reading by reference to said scale which is proportional to the current flowing in said second circuit exclusive of that flowing in said first mentioned circuit when current of a predetermined value is flowing in said load circuits.

7. A storage battery tester comprising, a load circuit having a fixed low resistance adapted to be connected across the terminals of a battery, a second load circuit including a variable resistance adapted to be connected across the terminals of a battery, the ohmage value of said variable resistance being from 5 to 50 times greater than that of the first mentioned load circuit and a condition indicator comprising a meter adapted to be included in said second load circuit, having a scale which is calibrated in relation to said variable resistance and having a hand which is capable of giving a final reading by reference to said scale which is proportional to the current flowing in said second circuit exclusive of that flowing in said first mentioned circuit when current of predetermined fixed value is flowing in said load circuits.

8. A storage battery tester comprising, a load circuit having a fixed low resistance adapted to be connected across the terminals of a battery, a second load circuit including a variable resistance adapted to be connected across the terminals of a battery, said variable resistance having such maximum ohmage value as to carry $\frac{1}{10}$ to $\frac{1}{3}$ of the current flowing in said first mentioned load circuit when both of said load circuits are connected across the battery, a meter included in both of said load circuits to give readings which are proportional to the total current flowing in said circuits, said meter having a temperature scale and said variable resistance having a manually adjustable member operative to vary the resistance whereby the total current flowing in said circuit may be adjusted to compensate for the temperature of the battery by reference to said temperature scale, and a condition indicator modified in its indication by the position of said variable resistance and capable of giving a final reading which is proportional to the current flowing in said second circuit exclusive of that flowing in said first mentioned circuit when both of said load circuits are connected across the battery and said resistance is adjusted to draw a predetermined current from the battery.

9. A storage battery tester comprising, a load circuit adapted to be connected to the terminals of the battery cell or cells to be tested, a fixed resistance and a variable resistance included in series in said load circuit, the ohmage value of said fixed resistance being from 2 to 5 times greater than that of said variable resistance and said variable resistance being adjustable to draw a predetermined current from the cell or cells under test and a condition indicator calibrated in relation to said variable resistance and having a scale and a movable member which by reference to said scale is capable of giving a final reading which is proportional to the voltage drop across said variable resistance exclusive of the drop across the terminals of said fixed resistance.

10. A storage battery tester comprising, a load circuit adapted to be connected to the terminals of the battery cell or cells to be tested, a fixed resistance and a variable resistance included in series in said load circuit, the ohmage value of said fixed resistance being from 2 to 5 times greater than that of said variable resistance, said variable resistance being adjustable to draw a predetermined current from the cell or cells under test and a condition indicator having a scale calibrated in relation to said variable resistance and a hand operable in relation to said variable resistance and scale and capable of giving a final reading by reference to said scale which is proportional to the voltage drop across said variable resistance exclusive of the drop across the terminals of said fixed resistance.

11. A storage battery tester comprising, a load circuit adapted to be connected to the terminals of the battery cell or cells to be tested, a fixed resistance and a variable resistance included in series in said load circuit, the ohmage value of said first resistance being from 2 to 5 times greater than that of said variable resistance and said variable resistance being adjustable to draw a predetermined current from the cell or cells under test and a condition indicator comprising a voltmeter connected directly across the terminals of said variable resistance and capable of giving a final reading which is proportional to the voltage drop therein.

12. A storage battery tester comprising, a load circuit adapted to be connected to the battery to be tested, a fixed resistance and a variable resistance included in series in said load circuit, the ohmage value of said fixed resistance being from 2 to 5 times greater than that of said variable resistance and a condition indicator calibrated in relation to said variable resistance and having a scale, legends associated with said scale and a movable member which by reference to said scale is capable of giving a final reading which is proportional to the voltage drop across the terminals of said variable resistance.

13. A storage battery tester comprising, a load circuit adapted to be connected to the battery to be tested, a fixed resistance and a variable resistance included in series in said load circuit, the ohmage value of said fixed resistance being from 2 to 5 times greater than that of said variable resistance, an ammeter connected in series in said load circuit, a temperature indicator scale associated with said ammeter whereby the latter becomes a temperature selector and compensator and a condition indicator calibrated in relation to said variable resistance and having a scale and a movable member which by reference to said scale is capable of giving a final reading which is proportional to the voltage drop across the terminals of said variable resistance.

14. A storage battery tester comprising, a load circuit adapted to be connected to the battery to be tested, a fixed resistance and a variable resistance included in series in said load circuit, the ohmage value of said fixed resistance being approximately three times that of said variable resistance, an ammeter connected in series in said load circuit and a condition indicator comprising a voltmeter connected across the terminals of said variable resistance to give a final reading which is proportional to the voltage drop across the terminals of said variable resistance.

GEORGE S. TANNER.

REFERENCES CITED

The following references are of record in the file of this patent:

UNITED STATES PATENTS

| Number | Name | Date |
| --- | --- | --- |
| 2,181,303 | Leingang et al. | Nov. 28, 1939 |
| 2,225,051 | Heyer | Dec. 17, 1940 |